July 30, 1935. G. H. HUFFERD ET AL 2,009,401
JOINT
Filed April 2, 1934
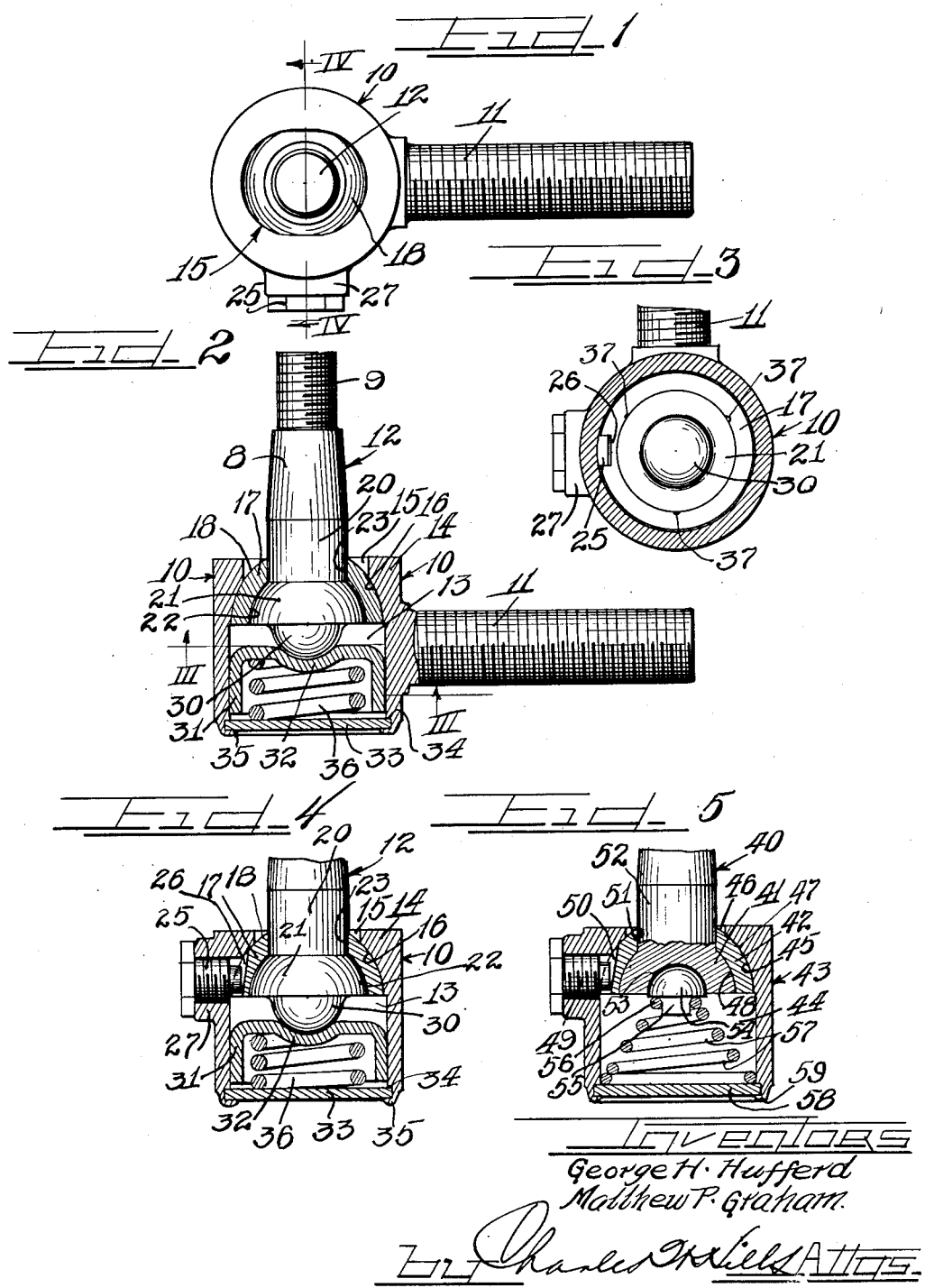
Inventors
George H. Hufferd
Matthew P. Graham Patented July 30, 1935

2,009,401

UNITED STATES PATENT OFFICE 2,009,401

JOINT

George H. Hufferd and Matthew P. Graham, Detroit, Mich., assignors to Thompson Products, Incorporated, Cleveland, Ohio, a corporation of Ohio Application April 2, 1934, Serial No. 718,612

3 Claims. (Cl. 287—90)

This invention relates to joints suitable for use in tie rod connections for steering apparatus of automotive vehicles. More specifically this invention relates to tie rod joints provided with individual bearing surfaces for tilting and rotating movement.

The steering apparatus of automotive vehicles provided with independently mounted front wheels requires the use of joints permitting tilting movement throughout a wide range. At the same time a free rotary movement of the joint stud relative to the housing or socket is also required at all times so that the wheels may be readily turned regardless of their relative position in a horizontal plane.

In the copending application of George H. Hufferd, Serial No. 684,523 filed August 10, 1933, there is described and claimed a type of tie rod joint having separate bearing surfaces for the tilting movement of the stud and for the rotating movement of the stud about its own axis. In the joint described in this application the tilting movements are permitted by spherical or segmental spherical cooperating bearing surfaces while the rotating movements of the stud about its own axis are permitted by separate bearing surfaces which are not of a spherical nature.

We have now provided a type of tie rod joint having cooperating bearing surfaces of varying dimensions in the joint housing for permitting tilting movement and separate cooperating bearing surfaces of varying dimensions on the stud permitting rotary movement of the stud about its own axis. In addition, bearing surfaces parallel to the axis of the stud and housing are provided for preventing tilting movement of the stud about the bearing surfaces of revolution. These bearing surfaces which are parallel to the axis of the stud transmit any tilting movement of the stud to the bearing surfaces in the housing.

It is therefore an object of this invention to provide joints having separate bearing surfaces for tilting movement of the stud and for rotary movement of the stud about its own axis.

Another object of this invention is to provide a type of tie rod joint having cooperating bearing surfaces for tilting movement of the joint stud member relative to the joint housing and separate bearing surfaces of varying dimensions for rotation of the stud about its own axis together with means for transmitting any tilting movement of the stud to the first mentioned cooperating bearing surfaces.

A specific object of this invention is to provide a type of tie rod joints having spherical or segmental spherical bearing surfaces permitting tilting movement of the stud joint member relative to the joint housing and spherical or segmental spherical bearing surfaces permitting free rotation of the stud about its own axis together with means for transmitting tilting movement from the stud to the first mentioned bearing surfaces.

A further object of this invention is to provide tie rod joints which are self-adjustable for wear during usage and which have separate bearing surfaces for tilting movement and for rotary movement together with means preventing the respective bearing surfaces from performing other than their delegated functions.

Other and further objects of this invention will be apparent to those skilled in the art from the following detail description of the accompanying sheet of drawings which illustrate preferred embodiments of our invention. It is to be understood, however, that the specific embodiments shown in the drawing are capable of wide variation in design without departing from the scope of this invention.

On the drawing:

Figure 1 is a top plan view of an assembled joint of this invention.

Figure 2 is a side elevational view, with parts in vertical cross-section, of the joint shown in Figure 1.

Figure 3 is a fragmentary cross-sectional view, with parts in elevation, taken substantially along the line III—III of Figure 2.

Figure 4 is a fragmentary vertical sectional view, with parts in elevation, taken substantially along the line IV—IV of Figure 1.

Figure 5 is a fragmentary vertical sectional view, with parts in elevation, of a modified form of joint according to this invention.

As shown on the drawing:

The joint illustrated in Figures 1 to 4 inclusive comprises a housing or socket member 10 having an integral threaded shank portion 11 extending laterally therefrom. A stud member 12 is partially disposed within the housing 10.

The housing or socket 10 is provided with a cylindrical axial bore 13 for receiving the end of the stud 12 therein. The bore 13 has a cup shaped inturned portion 14 defining an opening 15 through which the stud 12 may freely extend. The opening 15, as shown in Fig. 1, is oval shaped permitting a larger arc for tilting movement of the stud in a plane parallel to the shank portion of the housing than is permitted in a plane normal to the shank portion. It should be understood that the opening 15 may be circular or any desired shape without departing from the principles of the invention.

The inturned portion 14 of the housing 10 defines a segmental spherical bearing surface 16 for receiving in bearing relation thereto a seating element 17 having an outside segmental spherical bearing surface 18 cooperating with the bearing surface 16 of the housing.

The stud 12 extends through the seating element 17 and has a cylindrical portion 20 and a segmental spherical portion 21 in contact with the seat member. The segmental spherical portion 21 of the stud member is freely rotatable on the segmental spherical inner bearing surfaces 22 of the seating element 17. The bearing portion 20 of the stud 12 is also in bearing relation with the top portion of the seating element 17 which has a bearing surface 23 parallel with the axis of the stud. The cooperating surfaces 20 and 23 transfer any tilting movement of the stud 12 to the cooperating bearing surfaces 16 and 18. The cooperating bearing surfaces 20 and 23 together with the surfaces 21 and 22 permit free rotary movement of the stud 12 about its own axis.

The seating element 17 is preferably locked against rotary movement about the axis of the stud in the housing by means of a locking pin 25 extending in screw thread relation through the housing wall into a slot 26 cut in the seating element. The slot permits free tilting action of the stud relative to the housing but locks the element against rotary movement about the axis of the stud so that all rotary movement of the stud about its own axis is borne by the inner segmental spherical bearing surface 22 and the cylindrical bearing surface 23 of the seating element 17.

A boss portion 27 is preferably formed on the side wall of the housing 10 to provide a threaded seat for the pin 25.

The stud 12 is preferably provided with a rounded end portion 30 immediately below the segmental spherical portion 21 thereof.

A dished cap 31 is adapted to be inserted in the opening 13 of the housing member and is slidable along the inner walls of the housing. The cap 31 is provided with a rounded depressed portion 32 for receiving the rounded end 30 of the stud 12. A cover plate 33 is inserted against a shoulder 34 provided in the end of the housing and the housing end walls are peened over as at 35 to secure the cover plate 33 in position.

A coiled spring 36 is held under compression between the cover plate 33 and the cap 31. The spring 36 urges the cap 31 against the stud end and holds the stud and seat element in operative position within the housing 10. As the bearing surfaces of the respective joint members become worn the joint is prevented from rattling or from becoming out of bearing adjustment by the coil spring which automatically compensates for wear and urges the bearing parts into proper adjustment. It is obvious that the compression of the spring may be varied to fit various operating conditions. Thus in some instances it may be desirable to have a joint which will resist tilting movement to a higher degree than is customary. This is readily accomplished by providing a spring exerting greater pressure against the stud end.

As is usual the stud member 12 has a threaded end portion 9 and a tapered intermediate bearing portion 8 for receiving the steering arm bushing therearound (not shown).

If desired, as shown in Figure 3, the seating element 17 may have grooves 37 cut therein for passage of lubricant to the bearing surfaces. These lubricant channels may be of any desired shape or size.

In Figure 5 there is illustrated another form of joint according to this invention in which a stud member 40 is provided with a segmental spherical end portion 41 extending through a seating element 42 similar to the seating element 17 illustrated in Figures 1 to 4. The joint housing 43 is formed with an axial bore 44 and segmental spherical bearing surfaces 45 near the top thereof defining an opening 46 through which the stud 40 may freely extend. The seating element 42 is provided with outside segmental spherical bearing surfaces cooperating with the bearing surfaces 45 of the housing and inside segmental spherical bearing surfaces 48 cooperating with the segmental spherical portion 41 of the stud.

The seating element 41 is locked against rotary movement about the axis of the stud by means of a locking pin 49 extending through the side wall of the housing in screw thread relation therewith into a groove 50 cut in the seating element.

The top portion of the seating element 41 is formed with a cylindrical bearing surface 51 in cooperating bearing relation with a cylindrical bearing portion 52 of the stud 40. The cooperating bearing surfaces 51 and 52 transmit tilting movement of the stud 40 to the cooperating bearing surface 47 of the seating element and 45 of the housing.

All rotary movements of the stud about its own axis are borne by the cooperating bearing surfaces 48 of the seating element and 41 of the stud together with the cylindrical bearing surfaces 52 of the stud and 51 of the seating element since the seating element 42 is locked against rotary movement about the axis of the stud by means of the locking pin 49.

The stud 40 instead of being provided with an extending rounded end such as the end 30 shown in Figures 1 to 4 is provided with a depressed rounded portion 53 for receiving a rounded segmental spherical button 54 therein. The button 54 is provided with a shank 55 for receiving therearound the top coil 56 of a tapered coil spring 57 held under compression in the bore 44 of the housing 43 by means of a cover plate 58 peened in the end of the housing at 59. It is obvious that the coil spring 57 urges the button 54 upward in the housing. The button 54 maintains the stud and seat element in proper bearing relation in the housing without in any way interfering with the rotary or tilting movements of the stud.

From the above description it is evident that we have provided an improved type of joint construction in which the rotary movements of the stud element about its own axis are borne by separate bearing surfaces than those permitting tilting movements of the stud relative to the housing. It is desired to provide these separate bearing surfaces in tie rod joints used in independently mounted wheel suspensions for automotive vehicles because of the high degree of tilting movements encountered in such suspensions. Free tilting movement throughout an arc of 15° from the vertical stud position is generally required and in some cases tilting action up to 22.5° may be encountered. Tilting action of the stud is transmitted to the outside bearing surfaces of the seating element and the bearing surfaces of the housing by means of separate cylindrical bearing surfaces other than those which permit the main rotary movement of the stud about its own axis.

This construction permits the formation of one-piece seating elements having inside and outside segmental spherical bearing surfaces. These seating elements may be readily constructed by coining or stamping operations from flat metal discs and the respective bearing surfaces do not have to be lapped into bearing relation because the cooperating bearing surfaces are all of a spherical nature and readily assume true bearing relationship with each other. The provision of separate bearing surfaces for transmitting tilting movement of the stud is an important feature of this invention since otherwise the stud member could tilt relative to the seating element, and prevent maintenance of separate bearing surfaces for tilting movement and for rotary movement of the stud about its own axis.

We are aware that many changes may be made and numerous details of construction may be varied through a wide range without departing from the principles of this invention, and we, therefore, do not purpose limiting the patent granted hereon otherwise than necessitated by the prior art.

Having now described our invention, what is claimed is:

1. In a joint, a housing, a stud extending from said housing in rotatable and tiltable relation thereto, a one-piece seating element in said housing having an inner and an outer segmental spherical bearing surface and a cylindrical bearing surface concentric with the axis of the stud, and means for locking said seating element against rotary movement about the axis of the housing, said stud having a segmental spherical bearing surface thereon for engaging with the inside bearing surface of said seating element and having a cylindrical bearing surface for cooperating with the cylindrical bearing surface of said seating element to transmit movements to the seating element.

2. A joint comprising an apertured housing having a segmental spherical bearing surface, a stud freely extending through said aperture having a segmental spherical head within said housing and a cylindrical bearing surface adjacent to said head, a seat member having inner and outer bearing surfaces conforming with the segmental spherical surfaces of said head and housing respectively and also having a cylindrical surface in bearing engagement with the cylindrical surface of said stud, and means constantly urging said respective segmental spherical surfaces into bearing relation.

3. A joint comprising an apertured housing having a segmental spherical bearing surface, a freely rotatable and tiltable stud extending through the aperture of said housing and having a segmental spherical head within said housing, an intermediate seat member having inner and outer bearing surfaces conforming with the segmental spherical surfaces of said head and housing respectively, said inner and outer bearing surfaces of said seat member being concentric and relatively unbroken with the exception of lubricant grooves in said inner surface, and means constantly urging said respective segmental spherical surfaces into bearing relation.

GEORGE H. HUFFERD.
MATTHEW P. GRAHAM.